PRIOR ART

INVENTOR.
Masahisa Miyagi
BY
Marn & Jangarathis
ATTORNEYS

INVENTOR.
Masahisa Miyagi
BY
Marn & Jangarathis
ATTORNEYS

United States Patent Office 3,517,314

Patented June 23, 1970

3,517,314

VARIABLE EMPHASIS FREQUENCY MODULATION SIGNAL TRANSMISSION SYSTEM

Masahisa Miyagi, Tokyo, Japan, assignor to Nippon Electric Company, Limited, Tokyo, Japan Filed Feb. 9, 1968, Ser. No. 704,350
Claims priority, application Japan, Feb. 13, 1967, 42/8,827
Int. Cl. H04b 1/12
U.S. Cl. 325—46 15 Claims

ABSTRACT OF THE DISCLOSURE

A variable emphasis frequency modulation signal transmission system including a variable pre-emphasis signal transmitter and a variable de-emphasis signal receiver; the variable pre-emphasis transmitter having an information signal divided into two portions of which one portion provides a preselected, pre-emphasized high frequency component which is translated into a first control signal varying in level in correspondence with the varying level of the information signal and the other portion is divided into two further portions of which one further portion is pre-emphasized by a first predetermined degree and the other further portion is pre-emphasized by a second predetermined degree which is different from the first predetermined level, and the pre-emphasized two further portions are differentially combined under control of the first control signal into a first composite signal varying in level in correspondence with the level variations of the information signal; and the receiver having a received signal divided into two additional portions of which one portion provides a second preselected, pre-emphasized high frequency component which is translated into a second control signal varying in level in correspondence with the varying level of the received signal and the other additional portion is divided into fifth and sixth portions of which the fifth portion is de-emphasized by a third predetermined degree which is equal to the first predetermined degree and the sixth portion is de-emphasized by a fourth predetermined degree which is equal to the second predetermined degree, and the de-emphasized fifth and sixth portions are differentially combined under control of the second control signal into a second composite signal varying in level in correspondence with the varying level of the received signal to provide a substantial reproduction of the transmitter information singal.

Figure 1A:
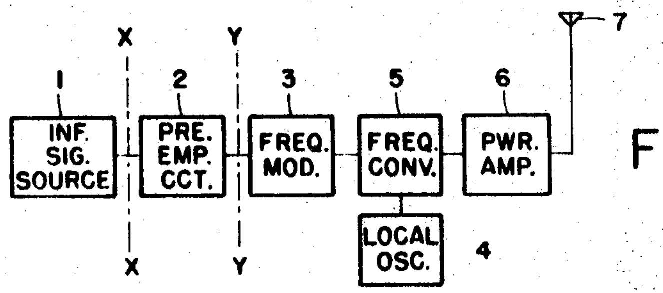
Fig. 1a. PRIOR ART

This invention relates to a frequency modulation signal transmission system including a pre-emphasized signal transmitter and a de-emphasized signal receiver, and more specifically, to such transmitter and receiver in which portions provided with different degrees of pre-emphasis and de-emphasis are differentially combined in response to control signals derived from pre-selected high frequency components of the respective transmitted and received signals to form composite signals in the transmitter and receiver representing a transmitter input signal.

It is heretofore well known in the art of frequency and phase modulation signal transmission that the transmission characteristics of the system can be improved by the employment of fixed emphasis circuits. The effective modulation degree in such system varies with time in response to variations in the content of the transmitted signal such, for example, as a television signal varying with time in its frequency spectrum and level. Inasmuch as the bandwidth of a signal transmission system is so determined as not to impair the transmission quality even when the modulation degree is a maximum, it may happen that the pass-band as a whole is not always efficiently used, particularly when the degree of modulation is small. This may result in a signal-to-noise ratio and a threshold level that cannot be satisfactorily improved. Attempts made heretofore to improve the efficiency of such signal transmission system have tended to introduce such complications therein as to render the system as highly impractical and intolerably expensive.

The present invention contemplates an improved, facile circuit arrangement for automatically varyingly controlling the degree of emphasis of different frequency components in a frequency modulation signal transmission system in such manner that the degree of emphasis is dependent upon the level of the high frequency content of a signal. The automatic emphasis control is provided by a pre-emphasized signal transmitter and a complementary de-emphasized signal receiver.

A principal object of the invention is to improve the quality of signal transmission in a frequency modulation signal transmission system.

Another object is to improve the signal-to-noise ratio in a frequency modulation signal transmission system.

A further object is to improve the threshold level in a frequency modulation signal transmission system.

An additional object is to make effective use of the entire signal bandwidth in a frequency modulation signal transmission system.

Still another object is to improve the efficiency of signal transmission in a frequency modulation signal transmission.

A still further object is to provide facile circuit equipment for improving the quality of signal transmission in a frequency modulation signal transmission system without deleteriously affecting the quality of signal transmission.

Still an additional object is to provide a facile, variable emphasis circuit arrangement for expeditiously improving the efficiency of a frequency modulation signal transmission system.

Another object is to introduce variable signal emphasis in opposite senses in the signal transmission and reception in a frequency modulation signal transmission system for improving the quality of signal transmission therein.

An additional object is to utilize variable signal pre-emphasis in the transmission of signals in a frequency modulation signal transmission system for improving the quality of signal transmission therein.

A further object is to employ variable signal de-emphasis in the reception of signals in a frequency modulation signal transmission for improving the quality of signal reception therein.

Still another object is to utilize a component of a preselected frequency for automatically varyingly controlling signal emphasis in such manner in a frequency modulation signal transmission system as to improve the quality of signal transmission therein.

A still further object is to provide a facile circuit arrangement utilizing a preselected high frequency component for automatically varyingly controlling the degree of emphasis of the high frequency components of a signal in a frequency modulation signal transmission system depending upon the level of the signal at economical costs of manufacture and maintenance.

In association with a transmitter of a frequency modulated carrier signal and a receiver for receiving such signal in a frequency modulated carrier signal system, a specific embodiment of the present invention comprises a transmitter embodying a first branching circuit to divide an input information signal into two portions of which one portion provides a preselected high frequency component which is pre-emphasized to a fixed degree and thereafter utilized to produce a first control signal varying in level in correspondence with the varying level of the input signal, a second branching circuit dividing the other portion of the two portions into two further portions of which one further portion is provided with a first predetermined degree of pre-emphasis and the other further portion is provided with a second predetermined degree of pre-emphasis which is smaller than the first predetermined degree, first and second amplifying means having variable gain controlled by the first control signal to differentially amplify the respective pre-emphasized one and other further signal portions in such manner that as the gain of the first amplifying means is increased to increase the level (or amount) of pre-emphasis of the high frequency components of the one further signal portion to a relatively high degree in response to an input signal having a high level, the gain of the second amplifying means is differentially decreased to increase the level of pre-emphasis of other frequency components of the other further signal portion to a lesser degree, and the opposite degrees of pre-emphasis of the high frequency and other frequency components of the one and other further signal portions are achieved in response to an input signal having a low level, means for combining the differentially amplified one and other further signal portions to form a first composite signal representing the input signal, and means for transmitting the first composite signal.

The receiver for receiving the transmitted signal embodies third branching circuit to divide the received signal into two additional signal portions of which one additional portion provides a preselected high frequency component which is pre-emphasized to a fixed degree and thereafter utilized to produce a second control signal varying in level in correspondence with the varying level of the received signal, a fourth branching circuit to divide the other additional portion into fifth and sixth portions of which the fifth portion is provided with a third predetermined degree of de-emphasis which is equal to the first predetermined degree and the sixth portion is provided with a fourth predetermined degree of de-emphasis which is equal to the second predetermined degree, third and fourth amplifying means having variable gain controlled by the second control signal to differentially amplify the respective de-emphasized fifth and sixth signal portions in such manner that as the gain of the third amplifying means is increased to increase the level (or amount (of de-emphasis of the high frequency components of the fifth signal portion to a relatively high degree in response to a received signal corresponding to a low level information signal, the gain of the fourth amplifying means is decreased to increase the level of de-emphasis of other frequency components of the sixth signal portion to a lesser degree, and the opposite degrees of de-emphasis of the high frequency and other frequency components of the fifth and sixth signal portions are achieved in response to a received signal corresponding to a high level information signal, means for combining the differentially amplified fifth and sixth signal portions to form a second composite signal as a substantial reproduction of the transmitter input information signal, and means for utilizing the second composite signal.

Thus, the pre-emphasis of the high frequency and other components of the input information signal in the transmitter is compensated for by the de-emphasis of the corresponding high frequency and other components of the received signal in the receiver.

Figure 1B:
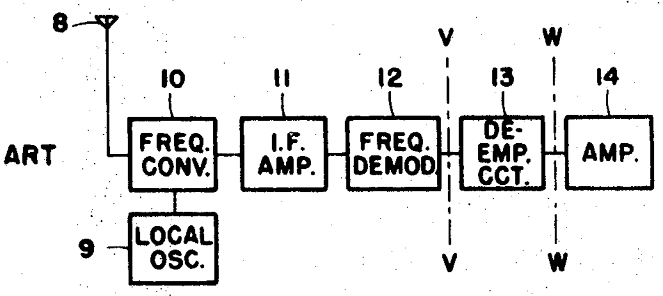
Figure 2:
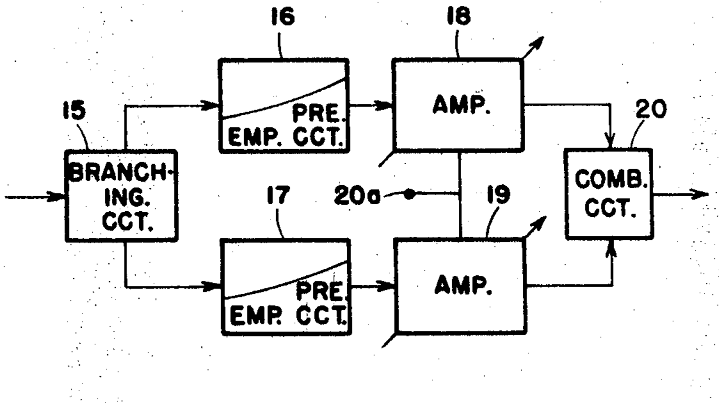
Figure 3A:
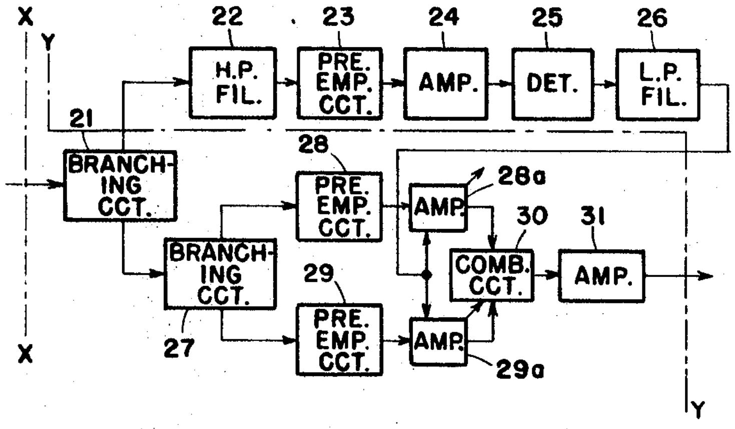

The invention is readily understood from the following description taken together with the accompanying drawing in which:

FIGS. 1*a* and 1*b* are block diagrams of a transmitter having fixed pre-emphasis and a receiver having fixed de-emphasis, respectively, in a frequency modulated carrier system of the prior art;

FIG. 2 is a block diagram of a pre-emphasis circuit usable in FIG. 3*a;*

FIG. 3*a* is a block diagram of a variable pre-emphasis circuit for a transmitter in accordance with a specific embodiment of the present invention as included between vertical lines X—X and Y—Y for substitution between the corresponding vertical lines in FIG. 1*a;*

Figures 4A, 4B:
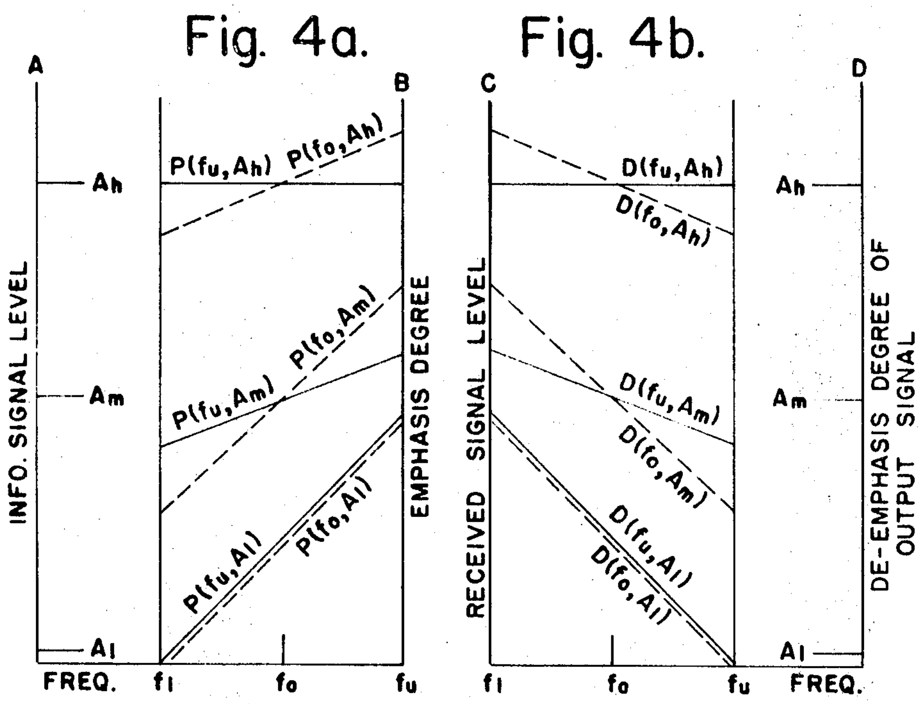
Figure 3B:
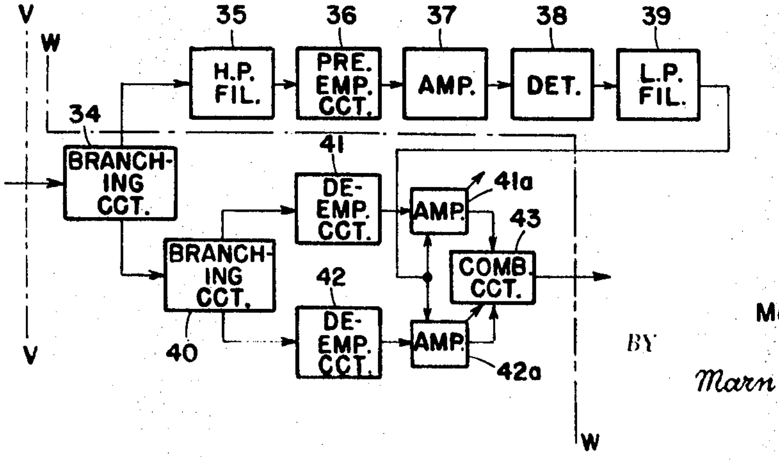

FIG. 3*b* is a block diagram of a variable de-emphasis circuit for a receiver in accordance with the specific embodiment of the present invention as included between vertical lines V—V and W—W for substitution between the corresponding vertical lines in FIG. 1*b;* and FIGS. 4*a* and 4*b* are families of curves illustrating the principle of variable pre-emphasis and de-emphasis, respectively, in accordance with the specific embodiment of the present invention.

FIG. 1*a* shows a carrier signal transmitter including a source 1 of an informational signal, a fixed pre-emphasis circuit 2, a frequency modulator 3, an oscillator 4 providing a local carrier signal, a frequency converter 5, a power output amplifier 6, and an antenna 7. FIG. 1*b* shows a carrier signal receiver including an antenna 8, an oscillator 9 providing a local carrier signal, a frequency converter 10, an intermediate frequency amplifier 11, a frequency demodulator 12, a fixed de-emphasis circuit 13, and an information signal amplifier means 14 for utilizing the demodulated received signal. The circuits represented by the boxes in FIGS. 1*a* and *b* operate to transmit and receive an information signal subject to fixed pre-emphasis and de-emphasis, respectively, via frequency modulated carrier signals in a manner well known in the prior art, and are therefore thought to require no further explanation here. It is understood that other circuits represented by the boxes in FIGS. 1*a* and *b* operate to transmit and receive an information signal subject to fixed pre-emphasis and de-emphasis, respectively, via phase modulated carrier signals in a manner well known in the prior art, and would therefore appear to require no further description here.

Inasmuch as the frequency components of noise contained in the demodulated signal show the so-called "triangular spectrum" in which the relatively high frequency components have a relatively high level noise, the signal-to-noise ratio is usually improved by making the frequency deviation corresponding to such high frequency components relatively large as compared with the extent of the frequency deviation of the low frequency components. However, the improvement in the signal-to-noise ratio has been found to be unsatisfactory because the characteristic of the pre-emphasis and de-emphasis circuits 2 and 13, respectively, in the prior art system is fixed and further because the latter circuits do not follow the variations in the levels of the various frequency components of the transmitted information signal and the received signal.

FIG. 2 shows a variable pre-emphasis circuit in accordance with a specific embodiment of the present invention, and comprises a branching circuit 15 for dividing an information signal into two portions of which one portion is pre-emphasized by a fixed degree of 20 decibels, for example, in a fixed pre-emphasis circuit 16 and the other portion is pre-emphasized by a fixed degree of 3 decibels, for example, in a fixed pre-emphasis circuit 17. The outputs of pre-emphasis circuits 16 and 17 are transmitted through variable gain amplifiers 18 and 19, respectively, whose gain is differentially controlled via a control signal having a varying level and applied to the latter amplifiers at a terminal **20*a* in a manner that is hereinafter explained. The outputs of the two variable gain amplifiers are combined in a combined circuit 20. The variable pre-emphasis is performed in FIG. 2 in such manner that as the gain of amplifier 18 is increased by the control signal, the gain of amplifier 19** is differentially decreased, and vice versa. Thus, when the gain of amplifier 18 is increased, the characteristic of pre-emphasis circuit 16 dominantly influences the level of the combined signal appearing at the output of the combiner circuit. One the other hand, when the gain amplifier 19 is increased while the gain of amplifier 18 is differentially decreased due to the opposite sense of operation of FIG. 2, then the characteristic of pre-emphasis circuit 17 dominantly influences the level of the combined signal appearing at the output of the combiner circuit.

FIG. 3*a* involving a variably pre-emphasis transmitter comprises a branching circuit 21 for dividing an information signal obtained at source 1 in FIG. 1*a* into two portions of which one portion is applied to a high-pass filter 22 to select a predetermined high frequency component which is provided with a fixed degree of pre-emphasis via pre-emphasis circuit 23. This pre-emphasized component amplified in amplifier 24 is translated by detector 25 into a first control signal representing the envelope of the latter component and varying in level in correspondence with the varying level of the information signal. This first control signal is available at the output of a low-pass filter 26 for a purpose that is hereinafter mentioned. The other portion of the information signal divided by branching circuit 21 is applied to a branching circuit 27 for division into two further portions of which one further portion is pre-emphasized in a pre-emphasis circuit 28 by a first predetermined degree of 20 decibels which is the same as that provided by pre-emphasis circuit 16 in FIG. 2. The other further portion is pre-emphasizsd in pre-emphasis circuit 29 by a second predetermined degree of 3 decibels which is the same as that provided by pre-emphasis circuit 17 in FIG. 2.

Amplifier 28*a* of variable gain in FIG. 3*a* has a first input connected to the output of pre-emphasis circuit 28 and an output to a first input of combiner circuit 30. Amplifier 29*a* of variable gain has a first input connected to the output of pre-emphasis circuit 29 and an output to a second input of combiner circuit 30. This circuit combines the outputs of the latter two amplifiers to provide a composite signal representing the information signal of source 1 in FIG. 1*a* and supplies the latter signal to the input of amplifier 31 which has its output connected to the input of frequency modulator 3 in FIG. 1*a*. Second inputs of amplifiers 28*a* and 29*a* are supplied with the control signal in the output of low-pass filter 26 for differentially controlling the gain of the latter two amplifiers essentially in the manner hereinbefore explained with regard to FIG. 2.

The variable pre-emphasis in FIG. 3*a* is preformed in such manner that as the gain of amplifier 28*a* is increased by the control signal of filter 26 to increase the level of pre-emphasis of the high frequency components in the one further signal portion to a relatively high degree in response to an information signal having a high level, the gain of amplifier 29*a* is differentially decreased to increase the level of pre-emphasis of other frequency components of the other further signal portion to a lesser degree and additionally in such manner that as the gain of amplifier 29*a* is increased by the control signal of filter 26 to increase the level of pre-emphasis of the other frequency components of the other further signal portion to a relatively high degree in response to an information signal having a low level, the gain of amplifier 28*a* is differentially decreased to increase the level of pre-emphasis of the high frequency components of the one further signal portion to a lesser degree. Thus, the high frequency components of the information signal or the first composite signal are emphasized to a relatively high degree in response to an information signal having a low level while the high frequency components are emphasized to a lesser degree (i.e., are less emphasized) in response to an information signal having a high level.

Further, it is apparent that the characteristic of pre-emphasis circuit 28 dominantly influences the level of the high frequency components of the composite information signal provided at the output of combiner circuit 30 in response to information signals of high level whereas the characteristic of pre-emphasis circuit 29 dominantly influences the level of the other frequency components (and the level of the high frequency components to a lesser degree) of the composite information signal provided in the output of combiner circuit 30 in response to information signals of a low level. It is understood that pre-emphasis circuits 28 and 29 may embody pre-emphasis level-frequency characteristics in general as hereinafter explained with reference to FIG. 4*a*. It is obvious in FIG. 3*a* that high-pass filter 22, pre-emphasis circuit 23, amplifier 24, detector 25 and low-pass filter 26 may be provided with such frequency characteristics as to produce the necessary first control signal depending upon the frequency content of a particular type of information signal as provided by source 1 in FIG. 1*a*. It is noted that the variable pre-emphasis circuit in FIG. 3*a* responds instantly to variations in the frequencies and level of the information signal as further mentioned hereinafter.

When the information signal as supplied by source 1 in FIG. 1*a* comprises frequency components extending from a very low numerical frequency region to a very high numerical frequency region, as in the case of a television information, it is feasible to shorten the time response by subjecting only the high frequency components of such signal to pre-emphasis while at the same time dispensing with the pre-emphasis of the lower frequency components of the signal. For this purpose, FIG. 3*a* may be modified with a second high-pass filter inserted, not shown, in place of high-pass filter 22 to select a very high signal component of a predetermined frequency. This means that the control signal obtainable at the output of low-pass filter 26 serves to control only the high frequency component.

FIG. 3*b* involving a variable de-emphasis receiver comprises a branching circuit 34 for dividing a frequency demodulated received signal into two portions of which one portion is applied to a high-frequency filter 35 to select a predetermined high frequency component which is provided with a fixed level of pre-emphasis via pre-emphasis circuit 36. This pre-emphasized component amplified in amplifier 37 is translated by detector 38 into a second control signal representing the envelope of the latter component and varying in level in correspondence with the varying level of the latter component. The signal, after being processed by pre-emphasis circuit 36, makes its possible to discriminate the variation with frequency of the emphasis degree. This second control signal is available at the output low-pass filter 39 for a purpose that is subsequently explained. The other portion of the received signal divided at branching circuit 34 is supplied to a branching circuit 40 for division into two additional portions of which one additional portion is de-emphasized in de-emphasis circuit 41 by a third predetermined level of 20 decibels which is equal to the first predetermined level of 20 decibels of the pre-emphasized portion in the output of pre-emphasis circuit 28 in FIG. 3*a* as above mentioned. The other additional portion is de-emphasized in de-emphasis circuit 42 by a fourth predetermined level of 3 decibels which is equal to the second predetermined level of the pre-emphasized portion in the output of pre-emphasis circuit 29 in FIG. 3*a*.

Amplifier 41*a* of variable gain in FIG. 3*b* has a first input connected to the output of de-emphasis circuit 41 and an output to a first input of combiner circuit 43. Amplifier 42*a* of variable gain has a first input connected to the output of de-emphasis circuit 42 and an output to a second input of combiner circuit 43. This circuit combines the outputs of the latter two amplifiers to provide a second composite signal as a substantial reproduction of the information signal supplied by source 1 in FIG. 1*a* for application to the input of amplifier 14 in FIG. 1*b* which represents a utilization circuit for the latter composite signal. Second inputs of amplifiers 41*a* and 42*a* are supplied with the second control signal from the output of low-pass filter 39 in FIG. 3*b* for differentially controlling the gain of the latter two amplifiers essentially in the manner hereinbefore explained with regard to FIG. 2. It is noted that while the operation of FIG. 2 is concerned with pre-emphasis circuits, it is understood that it operates essentially in the same manner for de-emphasis circuits. The operation of FIG. 3*b* is now explained.

The variable de-emphasis in FIG. 3*b* is performed in such manner that as the gain of amplifier 41*a* is increased by the second control signal in the output of filter 39 to increase the level of de-emphasis of the high frequency components of the one additional signal portion to a relatively high degree in response to a received signal corresponding to a low level information signal, the gain of amplifier 42*a* is differentially decreased to increase the level of de-emphasis of the other frequency components of the other additional signal portion to a lesser degree and additionally in such manner that as the gain of amplifier 42*a* is increased by the second control signal to increase the level of de-emphasis of the other frequency components of the other additional signal portion to a relatively high degree in response to a received signal corresponding to a high level information, the gain of amplifier 41*a* is differentially decreased to increase the level of de-emphasis of the high frequency components of the one additional signal portion to a lesser degree. Thus, the high frequency components of the second composite signal are de-emphasized to a high degree (i.e., are more de-emphasized) in response to a received signal corresponding to a low level information signal while the high frequency components are de-emphasized to a low degree (i.e., are less de-emphasized) in response to a received signal corresponding to a high level information signal.

Further, it is evident that the characteristic of de-emphasis circuit 41 dominantly influences the level of the high frequency components of the second composite signal formed at the output of combiner circuit 43 in response to recieved signals of high level whereas the characteristic of de-emphasis circuit 42 dominantly influences the level of the other frequency components of the second composite signal (and the de-emphasis of the high frequency components to a lesser degree) of the second composite signal formed at the output of combiner circuit 43 in response to received signals of low level. It is understood that de-emphasis circuits 41 and 42 may embody de-emphasis level frequency characteristics in general as hereinbelow explained with regard to FIG. 4*b*. It is evident in FIG. 3*b* that high-pass filter 35, pre-emphasis circuit 36, amplifier 37, detector 38 and low-pass filter 39 may be provided with such frequency characteristics as to produce the necessary second control signal depending upon the frequency content of a particular type of received signal (or information signal in FIG. 1*a*) in FIG. 1*b*. It is noted that the variable de-emphasis circuit in FIG. 3*b* responds instantly to variations in the frequencies and level of the received signal as additionally mentioned below.

The de-emphasis characteristics of the receiver in FIG. 3*b* are complementary to the pre-emphasis characteristics of the transmitter in FIG. 3*a*. That is to say the characteristics of pre-emphasis circuits 28 and 29 in FIG. 3*a* correspond with those of de-emphasis circuits 41 and 42, respectively; and the characteristics of high-pass filter 22, amplifier 24, detector 25 and low-pass filter 26 of the transmitter in FIG. 3*a* are identical with those of high-pass filter 35, amplifier 37, detector 38 and low-pass filter 39, respectively, of the receiver in FIG. 3*b*. This enables the receiver to produce an output signal which is a substantial reproduction of the information signal supplied to the input of the transmitter.

It is understood that the degrees of pre-emphasis levels of 20 and 3 decibels provided by pre-emphasis circuits 16 and 17, respectively, in FIG. 2, and the corresponding degrees of pre-emphasis levels provided by the respective pre-emphasis circuits 28 and 29 in FIG. 3*a*, and the corresponding degrees of de-emphasis levels provided by respective de-emphasis circuits 41 and 42 in FIG. 3*b* are selected herein merely for the purpose of this explanation and that they may be changed to other degrees of relative levels as the circumstances of particular carrier signal transmission systems may require.

It is obvious that FIG. 3*b* may also be modified to shorten the time response for the de-emphasis of only high frequency components of the received signal in the manner of the modification of FIG. 3*a* to shorten the time response for the pre-emphasis of only high frequency components (as in a television signal) of the information signal in FIG. 1*a* as hereinbefore mentioned.

FIG. 4*a* relating to the variable pre-emphasis circuit embodied in the transmitter of FIGS. 1*a* and 3*a* comprises ordinate A representing the relative levels of an information signal supplied by source 1 in FIG. 1*a* and having a portion applied to pre-emphasis circuits 28 and 29 in FIG. 3*a*; an ordinate B showing the relative emphasis degrees of the pre-emphasized information signal, and an abscissa illustrating the information signal frequency ranging from a minimum $f_l$ to a maximum $f_u$. This frequency range is defined by the pass-band of high-pass filter 22 in FIG. 3*a* as mentioned later herein. Frequency $f_o$ occurs at a predetermined time between the times of frequencies $f_l$ and $f_u$ of the abscissa.

Broken line curves $P(f_o, A_l,)$ $P(f_o, A_m)$ and $P(f_o, A_h)$ show the emphasis characteristics for low, medium and high levels $A_l$, $A_m$ and $A_h$, respectively, of the information signal in FIG. 1*a*—assuming a certain instant at which the latter signal frequency is $f_o$. As indicated in the respective curves, the degree of emphasis can be made moderate as the level of the information signal increases. Similarly, full line curves $P(f_u, A_l)$, $P(f_u, A_m)$ and $P(f_u, A_h)$ delineate the emphasis characteristics—at a certain instant when the information signal has a frequency $f_u$. The full-line curves illustrate that the degrees of emphasis at the respective levels of the frequency $f_u$ can be made more moderate than the degrees of emphasis at the respective levels of the frequency $f_o$ as the level of the information signal is increased.

Since the frequency and level of the information signal are instantly varying, the emphasis characteristic should be instantly changed in response thereto—although emphasis curves only for the instantaneous frequencies $f_o$ and $f_u$ at levels $A_l$, $A_m$ and $A_h$ as parameters are shown in FIG. 4*a*. As a practical matter, however, it is very difficult to instantaneously control the emphasis characteristics in response to instantaneous variations in both the level and frequency of the signal. Therefore, FIG. 3*a* includes a control signal available in the output of low-pass filter 26 as a representation of the level of the information signal at a frequency region higher than a certain frequency defined by high-pass filter 22. It is understood that the high frequency components selected by filter 22 make it possible to produce a first composite signal (enabling the desired emphasis control as explained relative to FIG. 2) in the output of combiner circuit 30 as a combination of the fixed pre-emphasis characteristics of pre-emphasis circuits 28 and 29 and the differentially controlled gain of amplifiers 28*a* and 29*a* in FIG. 3*a*.

FIG. 4*b* relating to variable de-emphasis circuit embodied in the receiver of FIGS. 1*b* and 3*b* comprises ordinate C representing the relative emphasis degree of the de-emphasized received signal, and an ordinate D in FIG. 4*b* showing the relative level of the received signal (corresponding to the information signal of FIG. 1*a*), and an abscissa illustrating the frequency of the signal received at the input of high-pass filter 35 and varying in frequency from $f_l$ to $f_u$ as in FIG. 4*a*. Broken line curves $D(f_o, A_l)$, $D(f_o, A_m)$ and $D(f_o, A_h)$ show the de-emphasis characteristics for low, medium and high levels $A_l$, $A_m$ and $A_h$, respectively, assuming at a certain instant the latter signal has a frequency $f_o$. It is noted that the latter curves are complementary to the corresponding curves $P(f_o, A_l)$, $P(f_o, A_m)$ and $P(f_o, A_h)$ in FIG. 4*a*. It is seen in the above-identified broken line curves of FIG. 4*b* that the degree of de-emphasis can be made moderate as the level of the second composite signal at the output of combiner circuit 43 is increased. Similarly, full line curves $D(f_u, A_l)$, $D(f_u, A_m)$ and $D(f_u, A_h)$ show the de-emphasis characteristics at a certain instant when the received signal at branching circuit 34 has a frequency $f_u$.

As in the case of the transmitter as previously explained, it is very difficult to instantaneously control the de-emphasis characteristics in response to instantaneous variations in both the level and frequency of the received signal. Therefore, FIG. 3*b* includes a control signal available in the output of low-pass filter 39 in FIG. 3*b* as a representation of the level of the received signal at a frequency region higher than a certain frequency defined by pass-band filter 35. It is understood that the high frequency components selected by filter 35 make it possible to produce a second composite signal in the output of combiner circuit 43 as a combination of the fixed de-emphasis characteristics of de-emphasis circuits 41 and 42 and the differentially controlled gain of amplifiers 41*a* and 41*b*.

It is noted that the latter curves are complementary to the curves $P(f_o, A_l)$, $P(f_o, A_m)$ and $P(f_o, A_h)$ in FIG. 4*a*. It is seen in the curves of FIG. 4*b* that the degrees of de-emphasis shown in curves $D(f_u, A_l)$, $D(f_u, A_m)$ and $D(f_u, A_h)$ can be made more moderate than those illustrated in curves $D(f_o, A_l)$, $D(f_o, A_m)$ and $D(f_o, A_h)$, respectively. Thus, the circuits of FIGS. 1*a* and *b* and 3*a* and *b*, and the curves of FIGS. 4*a* and *b* can be so predetermined that the second composite signal produced in the output of circuit combiner 43 is a substantial reproduction of the information signal supplied by source 1. It is therefore understood from the previous explanation that the frequency deviation of the carrier wave is relatively suppressed at the transmitter as the level of the high frequency component attains a high value and such compression is expanded at the receiver to provide thereat a substantial duplication of the original information signal.

The advantage of the invention shown in FIGS. 1*a* and *b*, 2, 3*a*, and *b*, and 4*a* and *b* resides in the fact that the high frequency component which usually exerts relatively little influence upon the overall performance of the information signal can be so controlled as to compress the bandwidth of the transmitted signal while the dominant influence of the medium or the low frequency component upon the overall performance of the information is only slightly impaired.

It is understood that the invention herein is described in specific respects for the purpose of this description. It is also understood that such respects are merely illustrative of the application of the invention. In this connection, for example, it is obvious that while the specific embodiment of the invention is described herein with reference to a frequency modulation signal transmission system, the invention can be expeditiously applied equally as well to a phase modulation signal transmission system as hereinbefore mentioned. Numerous other arrangements may be devised by those skilled in the art without departing from the spirit and scope of the invention.

What is claimed is:

1. A variable emphasis signal transmission circuit, comprising:

a source of an information signal;

first branching means for dividing said signal into two portions;

means for pre-emphasizing a preselected high frequency component of one of said portions at a fixed degree;

means for translating the pre-emphasized one signal portion into a control signal varying in level in accordance with the varying level of said signal;

second branching means for dividing the other signal portion into two further signal portions;

means for varying the emphasis of said respective further signal portions by two fixed different predetermined degrees;

means activated by said control signal for differentially amplifying said two further signal portions of different predetermined emphasis degrees to provide high frequency components and other frequency components of said last-mentioned portions with different varying degrees of emphasis in response to variations in the level of said signal;

and means for utilizing the differentially amplified two further signal portions as a representation of said signal.

2. The circuit according to claim 1 in which said different emphasis varying means varies the emphasis of said two further portions in such manner that the latter two portions are varied in pre-emphasis by said two different predetermined degrees.

3. The circuit according to claim 1 in which said different emphasis varying means includes a second pre-emphasis means for providing one of said further portions by a first predetermined degree of emphasis, and a third pre-emphasis means for providing the other of said further portions by a second predetermined degree of emphasis which is lower than said first predetermined emphasis degree.

4. The circuit according to claim 1 in which said different emphasis varying means varies the emphasis of said two further portions in such manner that the latter two portions are varied in de-emphasis by said two different predetermined degrees.

5. The circuit according to claim 1 in which said different emphasis varying means includes a first means for varying one of said two further portions by a first predetermined degree of de-emphasis, and a second means for varying the other of said two further portions by a second predetermined degree of de-emphasis which is lower than said first predetermined de-emphasis degree.

6. The circuit according to claim 3 in which said amplifier means includes a first amplifying means having variable gain and a first input connected to the output of said second pre-emphasis means and an output connected to a first input of said utilizing means, and a second amplifying means having variable gain and a first input connected to the output of said third pre-emphasis means and an output connected to a second input of said utilizing means, said first and second amplifying means having second inputs simultaneously activated by said control signal in such manner that as the gain of said first amplifying means is increased by said control signal to increase the level of pre-emphasis of high frequency components of said one further portion to a high degree in response to said information signal having a high level, the gain of said second amplifying means is differentially decreased by said control signal to increase the level of pre-emphasis of other frequency components of said other further signal portion to a lesser degree, and additionally in such manner that as the gain of said second amplifying means is increased by said control signal to increase the level of pre-emphasis of the other frequency components of said other pre-emphasized further portion to a high degree in response to said information signal having a low level, the gain of said first amplifying means is differentially decreased to increase the level of pre-emphasis of the high frequency components of said one pre-emphasized further portion to a lesser degree.

7. The circuit according to claim 5 in which said amplifying means includes a first amplifying means having variable gain and a first input connected to the output of said first deemphasis means and an output connected to a first input of said utilizing means, and a second amplifying means having variable gain and a first input connected to the output of said second de-emphasis means and an output connected to a second input of said utilizing means, said first and second amplifying means having second inputs simultaneously actuated by said control signal in such manner that as the gain of said first amplifying means is increased by said control signal to increase the level of de-emphasis of high frequency components of said one de-emphasized further portion to a high degree in response to said information signal corresponding to a low level information signal, the gain of said second amplifying means is differentially decreased by said control signal to increase the level of de-emphasis of other components of the other de-emphasized further signal portion to a lesser degree and additionally in such manner that as the gain of said second amplifying means is increased by said control signal to increase the level of de-emphasis of the other frequency components of said other de-emphasized further signal to a high degree in response to said information signal corresponding to a high level information signal, the gain of said first amplifying means is differentially decreased to increase the level of de-emphasis of the high frequency components of said one de-emphasized further portion to a lesser degree.

8. A variable emphasis signal transmitter, comprising:
a source of an information signal varying in level;
first branching means for dividing said signal into two portions;
means for providing one of said signal portions with a fixed degree of pre-emphasis;
means for translating said pre-emphasis one portion into a control signal varying in level in correspondence with the varying level of said information signal;
second branching means for dividing the other of said two signal portions into two further signal portions;
means for providing said respective two further signal portions with two fixed different predetermined degrees of pre-emphasis;
means having variable gain controlled by said control signal for differentially amplifying said last-mentioned pre-emphasis two further signal portions to emphasize different frequency components of said last-mentioned two portions to different degrees in response to varying levels of said information signal;
means for combining the differentially amplified two further signal portions to form a composite signal representing said information signal;
and means for transmitting said composite signal.

9. The transmitter according to claim 8 in which said predetermined pre-emphasis means comprises second means for providing one of said further signal portions with a first predetermined degree of pre-emphasis, and third means for providing the other of said further signal portions with a second pre-determined degree of pre-emphasis which is smaller than said first predetermined pre-emphasis degree.

10. The transmitter according to claim 9 in which said amplifying means comprises a first variable gain amplifying means having a first input connected to the output of said second pre-emphasis means and an output connected to a first input of said combining means, a second variable gain amplifying means having a first input connected to the output of said third pre-emphasis means and an output connected to a second input of said combining means, said first and second amplifying means having second inputs activated by said control signal in such manner that as the gain of said first amplifying means is increased by said control signal to increase the level of pre-emphasis of high frequency components of said one pre-emphasized further portion to a high degree in response to said information signal having a high level, the gain of said second amplifying means is differentially decreased by said control signal to increase the level of pre-emphasis of other frequency components of the other pre-emphasized further portion to a lesser degree, and additionally in such manner that as the gain of said second amplifying means is increased by said control signal to increase the level of pre-emphasis of the other frequency components of said other pre-emphasized further portion to a high degree in response to said information signal having a low level, the gain of said first amplifying means is differentially decreased to increase the level of pre-emphasis of the high frequency components of said one pre-emphasized further portion to a lesser degree.

11. A variable emphasis signal receiver, comprising:
means for receiving an incoming signal;
first branching means for dividing said incoming signal into two portions;
means for providing one of said two portions with a fixed degree of pre-emphasis;
means for translating said pre-emphasis one signal portion into a control signal varying in level in correspondence with the varying level of said incoming signal;
second branching means for dividing the other of said two signal portions into two further signal portions;
means for providing said respective two further signal portions with two fixed different degrees of de-emphasis
means having variable gain controlled by said control signal for differentially amplifying said last-mentioned de-emphasis two further signal portions to deemphasize different frequency components of said last-mentioned two portions to different degrees of de-emphasis in response to the varying level of said incoming signal;
means for combining the two differentially amplified further signal portions to form a composite signal representing said incoming signal;
and means for utilizing said composite signal.

12. The receiver according to claim 11 in which said predetermined de-emphasis means comprises a first means for providing one of said further signal portions with a first predetermined degree of de-emphasis, and a second means for providing the other of said further signal portions with a second predetermined degree of pre-emphasis, said last-mentioned second predetermined degree being smaller than said last-mentioned first predetermined degree.

13. The receiver according to claim 12 in which said amplifying means includes a first amplifying means having an input connected to the output of said first de-emphasis means and an output connected to a first input of said combining means, and a second amplifying means having an input connected to the output of said second de-emphasis means and an output connected to a second input of said combining means, said first and second amplifying means having second inputs simultaneously activated by said control signal in such manner that as the gain of said first amplifying means is increased by said control signal to increase the level of de-emphasis of high frequency components of said one de-emphasized further portion to a high degree in response to said incoming signal corresponding to a low level information signal, the gain of said second amplifying means is differentially decreased by said control signal to increase the level of de-emphasis of other components of said other de-emphasized further portion to a lesser degree and additionally in such manner that as the gain of said second amplifying means is increased by said control signal to increase the level of de-emphasis of said other frequency components of said other de-emphasized further portion to a high degree in response to said input signal corresponding to a high level information signal, the gain of said first amplifying means is differentially decreased to increase the level of de-emphasis of the high frequency components of said one de-emphasized further portion to a lesser degree.

14. A variable emphasis frequency modulated carrier signal transmission system, comprising:

- a transmitter including
  - a source of an information signal varying in level;
  - first branching means for dividing said signal into two portions;
  - means for providing one of said signal portions with a fixed degree of pre-emphasis;
  - means for translating said pre-emphasis one signal portion into a first control signal varying in level in correspondence with the varying level of said information signal;
  - second branching means for dividing the other of said two signal portions into two further signal portions;
  - means for providing said respective two further signal portions with two fixed different predetermined degrees of pre-emphasis;
  - means having variable gain controled by said first control signal for differentially amplifying said last-mentioned two pre-emphasis further signal portions to emphasize different frequency components of said last-mentioned two portions to different degrees in response to varying levels of said information signal;
  - means for combining said two differentially amplified further signal portions to form a first composite signal representing said information signal;
  - and means for transmitting said first composite signal;
- a receiver including
  - means for receiving an incoming signal representing said last-mentioned transmitted first composite signal;
  - third branching means for dividing said incoming signal into two additional portions;
  - means for providing one of said additional signal portions with fixed degree of pre-emphasis;
  - means for translating said pre-emphasis one additional signal portion into a second control signal varying in level in correspondence with the varying level of said incoming signal;
  - fourth branching means for dividing the other of said two additional portions into fifth and sixth signal portions;
  - means for providing said respective fifth and sixth signal portions with two different degrees of de-emphasis;
  - means having variable gain controlled by said second control signal for differentially amplifying said de-emphasized fifth and sixth signal portions to de-emphasize different frequency components of said last-mentioned signal portions to different degrees of de-emphasis in response to the varying level of said incoming signal;
  - means for combining said differentially amplified fifth and sixth signal portions to form a second composite signal as a substantial reproduction of said transmitter information signal; said receiver having predetermined signal frequency and level characteristics complementary to predetermined signal frequency and level characteristics of said transmitter for enabling said receiver to form said second composite signal as said reproduction of said transmitter information signal;
  - and means for utilizing said second composite signal.

15. A variable emphasis frequency modulated carrier signal transmission system, comprising:

- a transmitter including
  - a source of an information signal varying in level;
  - first branching means for dividing said signal into two portions;
  - means for providing one of said signal portions with a fixed degree of pre-emphasis;
  - means for translating said pre-emphasis one signal portion into a first control signal varying in level in correspondence with the varying level of said information signal;
  - second branching means for dividing the other of said two signal portions into two further signal portions;
  - means for providing one of said further signal portions with a first predetermined degree of pre-emphasis;
  - means for providing the other of said further signal portions with a second predetermined degree of pre-emphasis, said last-mentioned second degree being smaller than said last-mentioned first degree;
  - first ampliyfing means having variable gain for amplifying said one pre-emphasis further signal portion;
  - second amplifying means having variable gain for amplifying said other pre-emphasis further signal portion; said first and second amplifying means having said gain thereof simultaneously controlled by said first control signal in such manner that as the gain of said first amplifying means is increased by said control signal to increase the level of pre-emphasis of high frequency components of said one further signal portion to a high degree in response to said information signal having a low level, the gain of said second amplifying means is differentially decreased by said control signal to increase the level of pre-emphasis of other frequency components of said other further signal portion to a lesser degree, and additionally in such manner that as the gain of said second amplifying means is increased by said control signal to increase the level of pre-emphasis of said other frequency components of said other further signal portion to a high degree in response to said information signal having a high level, the gain of said first amplifying means is differentially decreased to increase the level of pre-emphasis of the high frequency components of said one further signal portion to a lesser degree;
  - means for combining said differentially amplified one and other further signal portions to form a first composite signal representing said information signal;
  - and means for transmitting said first composite signal;
- and a receiver including
  - means for receiving an incoming signal representing said transmitted first composite signal;
  - third branching means for dividing said incoming signal into two additional portions;
  - means for providing one of said additional signal portions with a fixed degree of pre-emphasis;
  - means for translating said pre-emphasis one additional signal portion into a second control signal varying in level in correspondence with the varying level of said incoming signal;

fourth branching means for dividing the other of said two additional portions into fifth and sixth signal portions;

means for providing said fifth signal portion with a third predetermined degree of de-emphasis, said third degree being equal to said first degree;

means for providing said sixth signal portion with a fourth predetermined degree of de-emphasis, said fourth degree being equal to said second degree;

third amplifying means having variable gain for amplifying said fifth de-emphasis signal portion;

fourth amplifying means having variable gain for amplifying said sixth de-emphasis signal portion; said third and fourth amplifying means having said gain thereof simultaneously controlled by said second control signal in such manner that as the gain of said third amplifying means is increased by said second control signal to increase the level of de-emphasis of high frequency components of said fifth de-emphasis signal portion to a high degree in response to said incoming signal corresponding to a low level information signal, the gain of said fourth amplifying means is differentially decreased by said second control signal to increase the level of de-emphasis of other frequency components of said sixth de-emphasis signal portion to a lesser degree and additionally in such manner that as the gain of said fourth amplifying means is increased by said second control signal to increase the level of de-emphasis of the other frequency components of said sixth de-emphasis signal portion to a high degree in response to said incoming signal corresponding to a high level information signal, the gain of said third amplifying means is differentially decreased to increase the level of de-emphasis of the high frequency components of said fifth signal portion to a lesser degree;

means for combining said two differentially amplified fifth and sixth signal portions to form a second composite signal as a substantial reproduction of said information signal; said receiver having predetermined signal frequency and level characteristics complementary to predetermined signal frequency and level characteristics of said transmitter for enabling said receiver to form said second signal as said reproduction of said information signal;

and means for utilizing said second composite signal.

References Cited

UNITED STATES PATENTS

| | | | |
|---|---|---|---|
| 3,111,635 | 11/1963 | Skov | 333—14 |
| 3,305,627 | 2/1967 | Krause | 178—5.2 |
| 3,444,469 | 5/1969 | Miyagi | 325—46 |

ROBERT L. GRIFFIN, Primary Examiner

K. W. WEINSTEIN, Assistant Examiner